United States Patent [19]

Skyba

[11] Patent Number: 4,754,531
[45] Date of Patent: Jul. 5, 1988

[54] ELASTIC TIE DOWN

[76] Inventor: Helmut K. Skyba, Rt. 2, Box 330, Wild Rose, Wis. 54984

[21] Appl. No.: 64,248

[22] Filed: Jun. 19, 1987

[51] Int. Cl.$^4$ .............................................. A44B 21/00
[52] U.S. Cl. ....................................... 24/300; 24/298; 24/371
[58] Field of Search ................. 24/300, 301, 302, 371, 24/298, 129 R, 129 A, 129 D

[56] References Cited

U.S. PATENT DOCUMENTS

| | | | |
|---|---|---|---|
| 1,153,334 | 9/1915 | Oswald | 24/300 |
| 1,321,660 | 11/1919 | Moriarty | 24/129 A |
| 1,696,220 | 12/1928 | Townsend | 24/301 |
| 2,650,448 | 9/1953 | Lichtig | 24/129 D |
| 2,704,961 | 3/1955 | Weil | 24/129 A |
| 2,991,524 | 5/1957 | Dobrikin |  |
| 3,435,487 | 4/1969 | Mazzel et al. | 24/371 |
| 3,469,287 | 9/1969 | Hamline | 24/298 |
| 3,636,594 | 1/1972 | Faivre | 24/298 |
| 4,529,240 | 7/1985 | Engel | 24/129 R |

Primary Examiner—Victor N. Sakran
Attorney, Agent, or Firm—Fuller, Puerner & Hohenfeldt

[57] ABSTRACT

An elastic tie down comprises an elastic tube that carries a slack rope inside thereof. The tube is tightly crimped directly to the rope, so that pulling the rope ends stretches the tube and imparts elastic qualities to the tie down. In a modified embodiment, an annular insert is placed into the ends of the tube, and the rope passes through the insert. The tube and insert are clamped, causing the insert to collapse to grip the rope. The present invention also includes abutments crimped to the rope for cooperating with bushings placed within the tube ends. The bushings are split and have inwardly converging surfaces that terminate in grooves. Tension applied to the rope ends causes the abutments to contact the bushing converging surfaces and force the bushings apart and into a tight grip with the tube and with solid rings surrounding the tube over the respective bushings. The invention further includes split sleeves held in place in the tubing ends with wedges. A passage through the sleeves receives the rope. Abutments on the rope capture a rope slack between the sleeves.

16 Claims, 1 Drawing Sheet

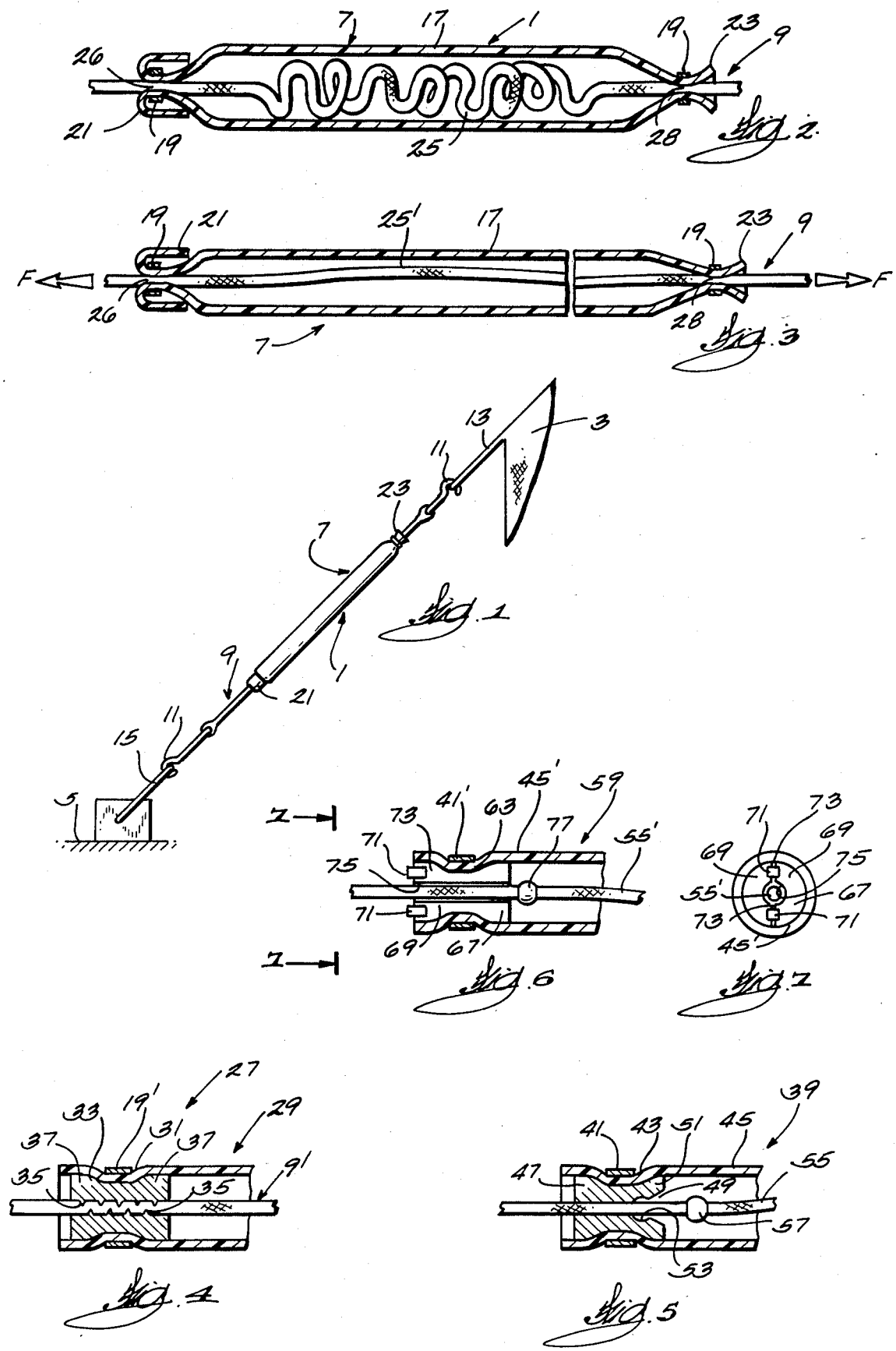

ELASTIC TIE DOWN

BACKGROUND OF THE INVENTION

1. Field of the Invention

This invention pertains to restraining devices, and more particularly to apparatus for resiliently restraining two bodies to each other.

2. Description of the Prior Art

Various equipment has been developed to restrain an object from moving away from a second object. A well known example of such devices is the elastic tie down. The usual application of a tie down is to resiliently hold a relatively small or light object within a predetermined distance of a larger and heavier body.

An advantage of elastic tie downs is that they are versatile and easy to install. That is because the tie downs can be stretched, within limits, to accommodate variable sizes of and distances between the objects. Further, elastic tie downs permit some relative movement between the restrained objects. In that manner, vibrations and other small relative motions can be accommodated without creating large stresses and subsequent harm to the tie down or to the restrained objects.

On the other hand, most elastic tie downs possess the disadvantage of being yieldable up to their breaking points. That is, as the force tending to separate the restrained objects increases, the tie down continually stretches until it finally breaks. Tie down breakage, of course, completely removes the restraint between the bodies. Even before breakage, however, the two objects may have become so widely separated that damage or other undesirable consequences occur.

To limit the yielding of elastic tie downs, it is known to combine a tension member of fixed length with an elastic member. Under moderate separating forces, the elastic member provides resilient restraint against separation, and the tension member remains slack and inoperative. Upon the separating force attaining a predetermined value, the elastic member becomes stretched such that the tension member is taut and takes over as the restraining member. Examples of such hold-down devices may be seen in U.S. Pat. Nos. 2,991,524; and also in 4,694,541, the disclosure of which is incorporated by reference herein.

Although the aforementioned hold-down devices are generally satisfactory, they nevertheless are subject to improvement and further development.

SUMMARY OF THE INVENTION

In accordance with the present invention, an elastic tie down is provided that represents an advance over prior resilient restraining devices. This is accomplished by apparatus that includes annular elements of various types that tightly join an elastic member to a flexible tension member.

The elastic member is made of a hollow tubular material having a diameter, length, wall thickness, and modulus of elasticity suited to the required application. Inserted through the tube is the tension member, which may be a flexible rope having adequate tensile strength but minimal column strength. A split metal ring is clamped tightly around the tube outer diameter at a predetermined distance from one end of the tube. The metal ring is clamped with sufficient tightness such that the rope is firmly grasped within and joined to the tube. A predetermined amount of rope slack is left within the tube. A second ring is clamped tightly to the tube second end. The amount of rope slack is chosen such that the maximum tube stretch is limited to a desired amount by the length of rope slack between the two clamping rings. The ends of the elastic tube outboard of the clamping rings are folded back over the rings, thereby protecting the rings from damage and also providing a smooth inlet for the rope into the tube.

In a modified embodiment of the present invention, a split annular insert is placed inside the ends of the tubes. The inner diameter of the insert is formed with teeth. The metal rings are positioned over the annular inserts. When the rings are tightened, they collapse the annular inserts such that the teeth penetrate the rope, thus assuring a slip-free attachment of the elastic tube to the rope.

In another embodiment of the invention, a pair of split annular inserts, each having an inwardly converging central passage and an internal groove, are employed. Small abutments, which may be spherically shaped, are crimped over the rope at a predetermined spacing therealong. The split annular inserts are assembled within the tube ends and under respective solid metal rings with the abutments located between the two annular inserts. Upon pulling the rope ends at assembly, the abutments enter the associated split insert converging passages, and seat in the internal grooves. As a result, the abutments force the inserts to expand against the tubular elastic member and the associated metal ring, thereby creating permanent tight connections between the rope and tube.

In a further embodiment, a diametrically split sleeve is installed in each tube end under a solid metal ring. A pair of wedges are forced into the gaps between the facing surfaces of the tube sleeve halves. The wedges expand the halves outwardly against the elastic tube and the associated solid ring. Abutments formed on the rope inside the tube bear against and are restrained by respective sleeves when the rope ends are pulled apart.

Other objects and advantages of the invention will become apparent to those skilled in the art from reading the disclosure.

BRIEF DESCRIPTION OF THE DRAWINGS

FIG. 1 a view of the elastic tie down of the present invention installed to resiliently restrain a first object against movement away from a second object;

FIG. 2 is an enlarged longitudinal cross sectional view taken through the elastic tie down of the present invention when in a relaxed condition;

FIG. 3 is a partial enlarged longitudinal cross sectional view taken through the elastic tie down of the present invention when in a working condition;

FIG. 4 is a partial enlarged longitudinal cross sectional view taken through a modified embodiment of the present invention;

FIG. 5 is a partial enlarged longitudinal cross sectional view taken through a further modified embodiment of the present invention;

FIG. 6 is a partial enlarged longitudinal cross sectional view taken through another modified embodiment of the present invention; and FIG. 7 a view taken along lines 7—7 of FIG. 6.

DETAILED DESCRIPTION OF THE INVENTION

Although the disclosure hereof is detailed and exact to enable those skilled in the art to practice the invention, the physical embodiments herein disclosed merely exemplify the invention which may be embodied in other specific structures. The scope of the invention is defined in the claims appended hereto.

Referring to FIG. 1, an elastic tie down 1 is illustrated that includes the present invention. The elastic tie down is particularly useful for resiliently restraining a first object 3 against movement away from a second object 5. Normally one of the objects 3 or 5 is relatively small and light compared with the other object. However, it will be understood that the invention is not limited to applications involving objects of unequal sizes.

The elastic tie down 1 comprises an elongated elastic member 7 and a flexible rope 9. In FIG. 1, the rope 9 is shown as having a hook 11 attached to each end. The hooks 11, in turn, are depicted as being secured to the objects 3 and 5 through intermediate lines 13 and 15, respectively. It will be appreciated, of course, that other elements may be substituted for the hooks and lines 13 and 15 for securing the rope to the objects.

Turning to FIG. 2, the elastic member 7 of the tie down 1 comprises a generally cylindrical tube 17. The tube 17 may be made from any suitably strong and elastic material. Through the interior of the tube extends a length of flexible rope 9. To firmly grip the rope to the tube, a radially split metal ring 19 is tightly crimped around the tube outer diameter near each of the tube ends. Because of the very tight grip produced by the split rings 19, the rope functions as though it were integrally joined to the two ends of the tube.

The rings 19 are located on the tube so as to form tube free ends 21 and 23. In FIG. 2, the free end 21 is shown folded back over the associated ring; the same folding is also possible with free end 23. Folding back the free ends is advantageous because folding provides a smooth surface for the rope 9 at the entrances to the tube, thereby minimizing rope chafing and wear. In addition, the folded back ends cover and protect the metal rings against damage and the weather, while simultaneously creating a neat appearance for the elastic member 7.

FIG. 2 shows the elastic tie down 1 of the present invention in the relaxed condition. In that condition, there is a predetermined length of rope slack 25 inside the elastic member 7. The amount of slack 25 is governed by the distance along the rope 9 between the points of joining 26, 28 created by the split rings 19. Turning to FIG. 3, a force F is shown applied to the rope, and, by means of the tight connection made possible by the split metal rings at rope points 26, 28, to the ends of the elastic member 7. Consequently, the tube 17 stretches, and the rope slack is taken out of the rope. In FIG. 3, approximately the maximum design force is shown applied to the rope, and the slack is almost entirely removed. If the force F increases further, the tube stretches until the rope slack is entirely removed. Any additional force is then carried entirely by the rope portion 25' that previously existed as slack under less than the maximum design force. Upon reducing or removing the force, the tube relaxes to reform the rope slack, as is shown in FIG. 2.

Referring to FIG. 4, a modified elastic tie down 27 is illustrated. The elastic tie down 27 comprises an elastic tube 29 in conjunction with a pair of longitudinally split annular inserts 33. In FIG. 4, only one end of the elastic tube 29, together with one insert 33, is shown, but it will be understood that both ends of the tie down are identical. In the illustrated embodiment, the insert 33 is manufactured with a circumferential depression 31 between the insert ends 37. The inner diameter of the insert is formed with a number of teeth 35 that protrude radially inwardly. Each insert is placed within an end of the elastic tube. The rope 9' with appropriate slack, not shown, is positioned in the desired location within the tube and inserts. Then the metal rings 19' are tightly crimped onto the tube over the inserts and in transverse alignment with their respective depressions 31. As a result, the teeth 35 penetrate the rope to create slip-proof connections between the rope and elastic tube.

Further in accordance with the present invention, the elastic tie down is capable of firmly joining an elastic member to a rope without requiring split metal rings. In the construction of FIG. 5, an elastic tie down 39 comprises two continuous metal rings 41. A longitudinally split bushing 47 is inserted into each end of the elastic tube 45. Each bushing 47 preferably has a circumferential depression 43. A ring 41 is placed over the tube in alignment with the bushing depression 43. Each bushing has a longitudinal passage 49 therethrough that converges from the interior end 51 toward the center of the bushing. At approximately the longitudinal midpoint of the bushing, the passage 49 is enlarged to define an internal groove 53.

To tightly join the rope 55 to the tube 45, two abutments 57 are crimped tightly onto the rope at a predetermined spacing therealong. The outer surface of each abutment 57 is fabricated to conform to the surface of the bushing internal groove 53. However, the major diameter of the groove is less than the major diameter of the abutment. By way of illustration in FIG. 5, the groove 53 is in the form of a hemisphere, and the abutment is a sphere of greater radius. When the elastic tie down 39 is assembled, the ends of the rope 55 are pulled apart until the abutments enter the associated converging passages 49. The abutments force the split bushings apart such that they expand and press the elastic tube 45 tightly against the respective solid rings 41. Continued pulling of the rope ends eventually causes the abutments to seat within the bushing groove. At that point, the rope and bushings are permanently and tightly joined to the elastic tube.

In the embodiment of the present invention illustrated in FIGS. 6 and 7, the rope 55' is not tightly joined to the elastic tube 45'. The elastic tie down 59 comprises an elastic tube 45' and solid metal rings 65. Into each end of the elastic tube 45' is pushed a sleeve 67 having a circumferential depression 63. The sleeve 67 is diametrically split to form two halves 69. The two halves 69 are forced apart by wedges 71 pressed into the gap between the two corresponding halve surfaces 73. The wedges force the sleeve halves 69 outwardly against the tubing 45' and against the solid ring 41'. The two sleeve halves define a longitudinally extending passage 75 through which the rope 55' easily slides. To prevent the rope from pulling out from the sleeves, abutments 77 are tightly crimped to the rope at predetermined locations therealong. In FIG. 6, the abutment 77 is shown as being of generally spherical shape, but other geometric configurations are also possible.

Thus, is is apparent that there has been provided, in accordance with the invention, an elastic tie down that fully satisfies the objects and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A tie down comprising:
   a. a flexible rope having first and second free ends and defining spaced first and second points therealong;
   b. an elastic tube having opposed ends and placed over the rope intermediate the ends thereof with the rope free ends extending oppositely from the respective tube ends, the elastic tube concealing the rope first and second points, the tube length being less than the spacing between the rope first and second points to create a rope slack inside the tube; and
   c. clamp means surrounding the elastic tube near the opposed ends thereof and in alignment with the rope first and second points and concentric with the rope and elastic tube for tightly crimping the tube directly onto the rope to thereby capture the rope slack between the tube ends and to create rope first and second ends extending oppositely from the ends of the tube and having sufficient length to afford connection of the rope ends for rope usage,
   so that applying tension to the rope ends causes tension on the elastic tube to stretch it and thereby impart elastic qualities to the tie down.

2. The tie down of claim 1 wherein the clamp means comprises a pair of tubular radially split rings concentric with the rope and elastic tube for collapsing over the elastic tube to tightly grip the tube directly onto the rope.

3. The tie down of claim 1 further comprising a longitudinally split annular insert installed within the tube at each end thereof and concentric therewith, the insert defining a passage therethrough concentric with the elastic tube for receiving the flexible rope,
   so that tightening the clamp means over the elastic tube causes the split insert to collapse on the rope first and second points and thereby tightly grip the rope to the elastic tube.

4. A tie down comprising:
   a. a flexible rope having first and second ends and defining spaced first and second points therealong;
   b. an elastic tube having opposed ends and placed over the rope intermediate the ends thereof and concealing the rope first and second points, the tube length being less than the spacing between the rope first and second points to create a rope slack inside the tube; and
   c. clamp means surrounding the elastic tube near the opposed ends thereof and in alignment with the rope first and second points for tightly crimping the tube onto the rope to thereby capture the rope slack between the tube ends and to create rope first and second ends extending oppositely from the ends of the tube and having sufficient length to afford connection of the rope ends for rope usage, wherein:
      i. the clamp means surrounds the elastic tube at predetermined distances from the respective tube ends; and
      ii. the tube portions between the respective clamp means and the associated tube ends are folded back over the clamp means,
   so that a smooth entrance is provided for the rope into the elastic tube and the clamp means is protected from damage.

5. A tie down comprising:
   a. a flexible rope having first and second ends and defining spaced first and second points therealong;
   b. an elastic tube having opposed ends and placed over the rope intermediate the ends thereof and concealing the rope first and second points, the tube length being less than the spacing between the rope first and second points to create a rope slack inside the tube;
   c. clamp means surrounding the elastic tube near the opposed ends thereof and in alignment with the rope first and second points for tightly crimping the tube onto the rope to thereby capture the rope slack between the tube ends and to create rope first and second ends extending oppositely from the ends of the tube and having sufficient length to afford connection of the rope ends for rope usage;
   d. a longitudinally split annular insert installed within the tube at each end thereof, the insert defining a passage therethrough for receiving the flexible rope, wherein the insert passage defines a plurality of inwardly directed teeth adapted to penetrate the rope at the first and second points therealong when the clamp means is tightened onto the elastic tube and insert,
   so that tightening the clamp means over the elastic tube causes the split insert to collapse on the rope first and second points and thereby tightly grip the rope to the elastic tube.

6. An elastic tie down comprising:
   a. a flexible rope having first and second ends and defining spaced first and second points therealong;
   b. a pair of longitudinally split annular inserts, each insert having a passage therethrough for receiving the rope and concentric therewith, an insert being placed over the rope first and second points;
   c. an elastic tube having opposed ends and placed concentrically over the annular inserts, the tube length being less than the space between the rope first and second points to create a rope slack inside the tube; and
   d. clamp means surrounding the elastic tube over the annular inserts and concentric therewith for tightly crimping the tube to joint the rope to the tube and capture the rope slack between the tube ends and to create rope first and second ends extending oppositely from the ends of the tube and having sufficient length to afford connection of the rope ends for rope usage,
   so that applying tension to the rope ends causes tension on the elastic tube to stretch it and thereby impart elastic qualities to the tie down.

7. The tie down of claim 7 wherein the clamp means comprises a pair of spaced radially split rings concentric with the rope and elastic tube for collapsing over the tube and inserts to tightly join the tube, inserts, and rope.

8. An elastic tie down comprising:
   a. a flexible rope having first and second ends and defining spaced first and second points therealong;
   b. a pair of longitudinally split annular inserts, each insert having a passage therethrough for receiving the rope, an insert being placed over the rope first and second points, wherein the passage the passage of each insert is formed with a plurality of inwardly directed teeth;
   c. an elastic tube having opposed ends and placed over the annular inserts, the tube length being less than the space between the rope first and second points to create a rope slack inside the tube; and d. clamp means surrounding the elastic tube over the annular inserts for tightly crimping the tube to join the rope to the tube and capture the rope slack between the tube ends and to create rope first and second ends extending oppositely from the ends of the tube and having sufficient length to afford connection of the rope ends for rope usage, so that the insert teeth penetrate the rope when the clamp means is tightened to collapse the inserts over the rope.

9. An elastic tie down comprising:
a. a flexible rope having first and second ends and a pair of spaced abutment means on the rope between the two ends;
b. a pair of longitudinally split annular bushings, the bushings being placed over the rope between a respective end thereof and the associated abutment means, each bushing having an interior end facing the respective abutment means and defining a passage therethrough that converges from the interior end toward the interior of the bushing, the bushing passage further defining an internal groove adapted to receive the abutment means;
c. an elastic tube placed over the rope intermediate the rope ends and encapsulating and concealing the bushings and the abutment means, the tube length being less than the spacing between the abutment means to create a rope slack inside the tube; and
d. a pair of rings, one ring being placed over the elastic tube in transverse alignment with each bushing, so that when the rope first and second ends are forced apart the abutment means enter the respective bushing converging passages to force the bushings outwardly into tight gripping contact with the elastic tube and the abutment means become seated in the respective bushing internal grooves.

10. The tie down of claim 9 wherein:
a. each bushing is formed with a circumferential depression; and
b. the rings are placed over the elastic tube and split bushings in transverse alignment with the bushing, circumferential depressions.

11. An elastic tie down comprising:
a. a flexible rope having first and second ends and a pair of spaced abutment means on the rope between the two ends;
b. an elastic tube placed over the rope intermediate the rope ends and encapsulating and concealing the abutment means, the tube length being less than the spacing between the abutment means to create a rope slack inside the sleeve; and
c. clamp means tightly gripped to each end of the elastic tube for capturing the respective abutment means inside the tube, wherein the clamp means comprises:
  i. a bushing inserted concentrically into and in tight gripping connection with each end of the tube; and
  ii. a ring concentrically surrounding the elastic tube in transverse alignment with each bushing,
so that the rope abutment means engages the bushings when tension is applied to the rope first and second ends.

12. The tie down of claim 11 wherein:
a. each bushing is longitudinally split; and
b. each bushing is formed with a surface for engaging and cooperating with the associated abutment means to force the bushing radially outwardly into tight gripping contact with the elastic tube and ring when tension is applied to the rope first and second ends.

13. An elastic tie down comprising:
a. a flexible rope having first and second ends and a pair of spaced abutment means on the rope between the two ends;
b. an elastic tube placed over the rope intermediate the rope ends and encapsulating and concealing the abutment means, the tube length being less than the spacing between the abutment means to create a rope slack inside the sleeve; and
c. clamp means tightly gripped to each end of the elastic tube for capturing the respective abutment means inside the tube, wherein the clamp means comprises a bushing inserted into and in tight gripping connection with each end of the tube, and a ring surrounding the elastic tube in transverse alignment with each bushing, and wherein:
  i. each bushing is longitudinally split; and
  ii. each bushing defines a passage therethrough, the passage converging from the end thereof facing the corresponding abutment means toward the interior of the bushing, the bushing passage further defining an internal groove that is adapted to receive the abutment means,
so that when tension is applied to the rope first and second ends, the abutment means engage and cooperate with the respective bushing converging passages to force the bushings into tight gripping engagement with the tube and ring, and the abutment means is received in the bushing internal grooves.

14. An elastic tie down comprising:
a. a flexible rope having first and second ends and a pair of spaced abutment means on the rope between the two ends;
b. an elastic tube placed over the rope intermediate the rope ends and encapsulating and concealing the abutment means, the tube length being less than the spacing between the abutment means to create a rope slack inside the sleeve; and
c. clamp means tightly gripped to each end of the elastic tube for capturing the respective abutment means inside the tube, wherein the clamp means comprises:
  i. an annular sleeve inserted into each end of the tube;
  ii. a ring surrounding the elastic tube in transverse alignment with each sleeve; and
  iii. wedge means for forcing the sleeve tightly against the elastic tube and respective ring.

15. The tie down of claim 14 wherein:
a. each sleeve is formed with a circumferential depression; and
b. the rings are placed over the elastic tube and split sleeves in transverse alignment with the sleeve circumferential depressions.

16. An elastic tie down comprising:
a. a flexible rope having first and second ends and a pair of spaced abutment means on the rope between the two ends;
b. an elastic tube placed over the rope intermediate the rope ends and encapsulating and concealing the abutment means, the tube length being less than the spacing between the abutment means to create a rope slack inside the sleeve; and c. clamp means tightly gripped to each end of the elastic tube for capturing the respective abutment means inside the tube, wherein the clamp means comprises:

i. a diametrically split sleeve inserted into each tube end and having a passage therethrough for receiving the rope, the sleeve defining two sleeve halves;

ii. a ring surrounding the elastic tube in transverse alignment with each split sleeve; and iii. wedge means inserted between the halves of each split sleeve to force the halves apart and into tight gripping contact with the elastic tube and associated ring.

* * * * *

UNITED STATES PATENT AND TRADEMARK OFFICE
CERTIFICATE OF CORRECTION

PATENT NO. : 4,754,531
DATED : July 5, 1988
INVENTOR(S) : Helmut K. Skyba

It is certified that error appears in the above—identified patent and that said Letters Patent is hereby corrected as shown below:

Column 6, Line 44 (claim 6)

"joint" should be ---join---

Column 6, Line 53 (claim 7)

"claim 7" should be ---claim 6---

Signed and Sealed this

Fifteenth Day of November, 1988

*Attest:*

DONALD J. QUIGG

*Attesting Officer*      *Commissioner of Patents and Trademarks*